March 14, 1967 C. R. MILLER 3,308,713

PORTABLE READER PRINTER

Filed Sept. 30, 1963 6 Sheets-Sheet 1

INVENTOR

CHRISTOPHER R. MILLER

BY Diggins, O'Boyle + Harmon

ATTORNEY

March 14, 1967 C. R. MILLER 3,308,713

PORTABLE READER PRINTER

Filed Sept. 30, 1963 6 Sheets-Sheet 2

INVENTOR
CHRISTOPHER R. MILLER

BY Diggins, O'Boyle + Harmon

ATTORNEY

INVENTOR
CHRISTOPHER R. MILLER

BY Diggins, O'Boyle & Hanson
ATTORNEY

PORTABLE READER PRINTER

INVENTOR
CHRISTOPHER R. MILLER

BY Diggins, O'Boyle + Harmon

ATTORNEY

INVENTOR
CHRISTOPHER R. MILLER
BY Diggins, O'Boyle & Harmon
ATTORNEY

INVENTOR
CHRISTOPHER R. MILLER
BY Diggins, O'Boyle & Harmon
ATTORNEY

United States Patent Office 3,308,713

Patented Mar. 14, 1967

3,308,713

PORTABLE READER PRINTER

Christopher R. Miller, Potomac, Md., assignor to Documentation, Incorporated, Bethesda, Md., a corporation of Maryland Filed Sept. 30, 1963, Ser. No. 312,407
40 Claims. (Cl. 88—24)

This invention relates to reader printer devices generally, and more particularly to an improved portable reader printer combination for selectively providing a visual or photomechanical reproduction of information stored upon a photographic film or similar transparent storage media.

Recent advances in the field of photography have resulted in the development of microfilming techniques for reproducing a large volume of documentary material upon a small photographic medium. This ability to reproduce information in compact form upon photographic film has resulted in the wide spread employment of photographic techniques for the implementation of compact document filing and storage plans.

However, documentary filing or storage systems which contemplate the use of photographic techniques to maintain many frames of documentary information within a minimal space allocation can be effective only if such information is readily available for reproduction or rapid visual review. To this end, optical reader units and photomechanical reproduction units have been devised which render information photographically stored in minute form suitable for visual observation or photomechanical reproduction.

Unfortunately, the effectiveness of advanced techniques for the photographic storage of documentary material have heretofore been severely limited by the inadequacies of existing apparatus for reading or reproducing such material. Optical reader units for documents stored in miniature on photographic film are normally bulky, non-portable devices which include intricate optical systems of delicate construction. The very nature of such reader devices negates any concept of portability, and often much of the space made available by the photographic storage of documents is consumed by the document reader.

Reproduction units having the capability to enlarge and copy microfilmed material combine the deficiences of optical reader units with those inherent in known photomechanical reproducing devices. In addition to bulk and complexity, such reproduction units incorporate liquid developer components which are incapable of containing liquid developer without loss during transport. As an additional hinderance to portability, these units also employ bulky photographic paper and supplies which must be separately stored and transported.

To facilitate effective storage of documentary material by photographic processes, the need has arisen for a combination reader printer unit of compact, portable nature having the capability to reproduce visually or by a photomechanical process selected frames of information. To achieve the desired portability, an ideal reader printer unit must eliminate the bulk and complexity of previous reader units while removing the limitations to portability presented by developer components employing liquid developing solutions. Additionally, a completely compact and portable unit must be free from the necessity of employing bulky photographic reproduction paper which is stored and transported separately from the unit. Ideally, a portable reader printer should incorporate such reproduction paper or material as a replaceable component within the machine, and if possible, to enhance unit compactness, this component should be designed for operation as a necessary combination component in the overall reader printer construction. The effective employment of photographic paper or material as a specially designed component in a reader printer combination provides the dual advantages of insuring the presence and storage of the necessary reproduction paper or material within the portable reader printer unit and also eliminates the necessity for transporting bulky reproduction material as a separate supply entity unassociated with the constructional configuration of the reader printer unit.

It is a primary object of this invention to provide an improved portable reader printer unit for selectively providing a visual display or photomechanical reproduction of information from a master or storage medium.

Another object of this invention is to provide an improved portable reader printer unit which incorporates a compact optical projection system in combination with a novel visual display and photographic sheet supply component and an improved photomechanical reproduction unit.

A further object of this invention is to provide an improved portable reader printer unit which includes a novel mechanical sheet feeding system for selectively feeding single photosensitive sheets from a storage packet to a photomechanical reproduction unit.

Another object of this invention is to provide an improved portable reader printer unit having a photomechanical reproduction system which includes a sealed developer unit to maintain stored liquid developer without spillage during the transportation of the unit.

A further object of this invention is to provide an improved portable reader printer unit which is capable of providing a substantially dry photoreproduction from the liquid developer section of a photomechanical reproduction unit.

Another object of this invention is to provide an improved portable reader printer unit which includes a novel mechanical sheet feeding system and a replaceable sheet supply packet especially adapted for use with the sheet feeding system to provide a visual reproduction screen for optically projected information and a photosensitive paper supply for a photomechanical reproduction system.

A further object of this invention is to provide an improved portable reader printer unit which includes a safety control mechanism to preclude the electrical energization of the reader printer power circuit until a specially designed replaceable sheet supply packet is inserted in operable position within the reader printer.

Another object of this invention is to provide an improved portable reader printer unit which incorporates a novel film drive control mechanism to adapt the reader printer for operation with strip film storage cassettes.

A further object of this invention is to provide a replaceable sheet supply packet especially adapted for use as a component in a portable reader printer unit.

Another object of this invention is to provide a novel sheet supply packet especially adapted for use as a component in a portable reader printer unit which includes sheets of clear, opaque sheet material designed to provide a projection screen for optically projected images stacked alternately with sheets of photosensitive reproduction material.

A further object of this invention is to provide a novel sheet supply packet especially adapted for use as a necessary component in a reader printer unit which includes a switch actuating mechanism to close an energizing switch in the reader printer power circuit.

Another object of this invention is to provide a sealed developer unit for a photomechanical reproduction system which is capable of directing photosensitive material into contact with a liquid developer solution while maintaining the solution sealed within a developer container.

A still further object of this invention is to provide an improved portable reader printer unit of compact economical construction which operates effectively to provide an enlarged visual display or photomechanical reproduction of information stored in miniature upon a photographic storage medium.

With the foregoing and other objects in view, the invention resides in the following specification and appended claims, certain embodiments and details of construction of which are illustrated in the accompanying drawings in which:

Figure 1:
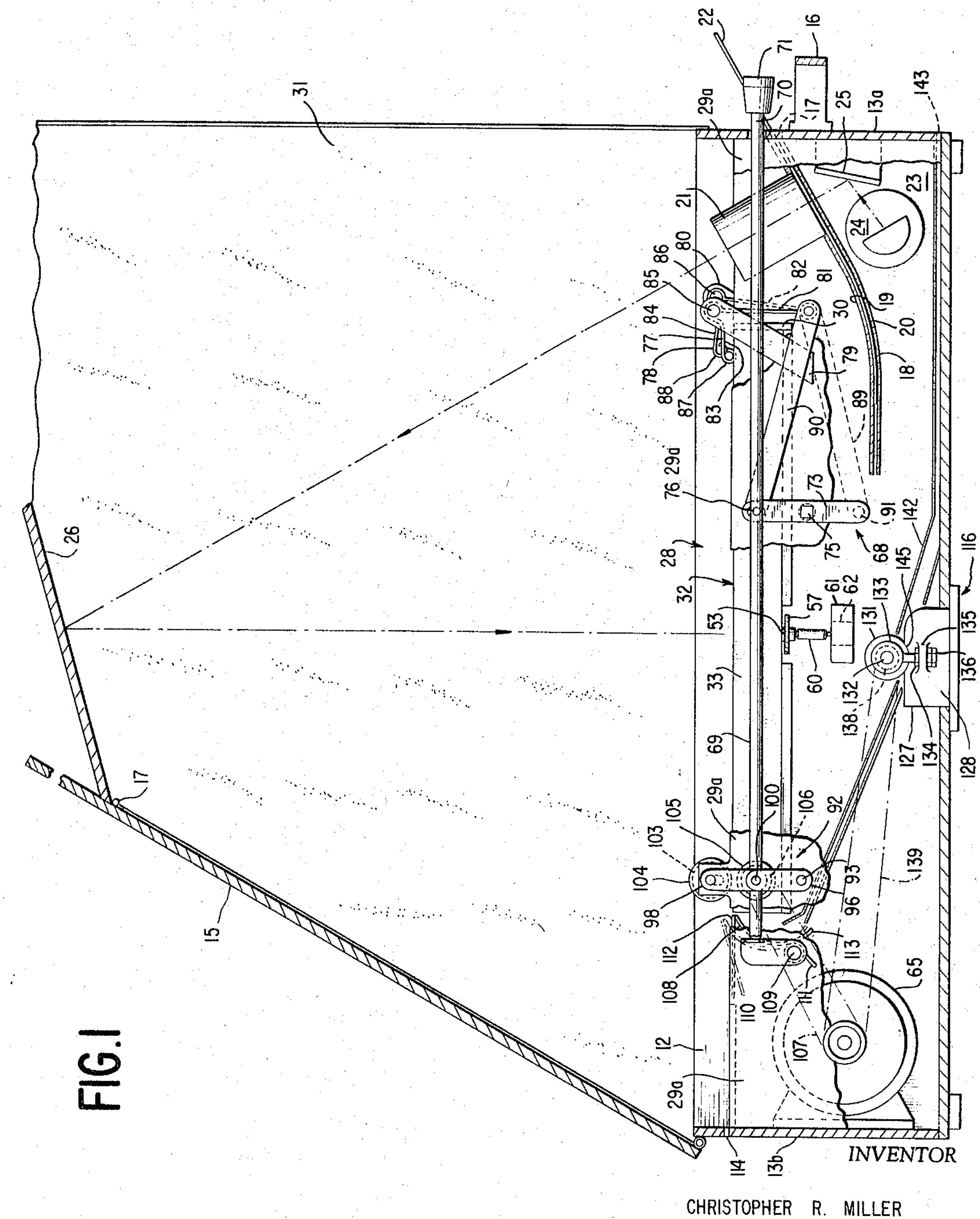
FIGURE 1 is a sectional view in side elevation illustrating the reader printer unit of the present invention.
Figure 2:
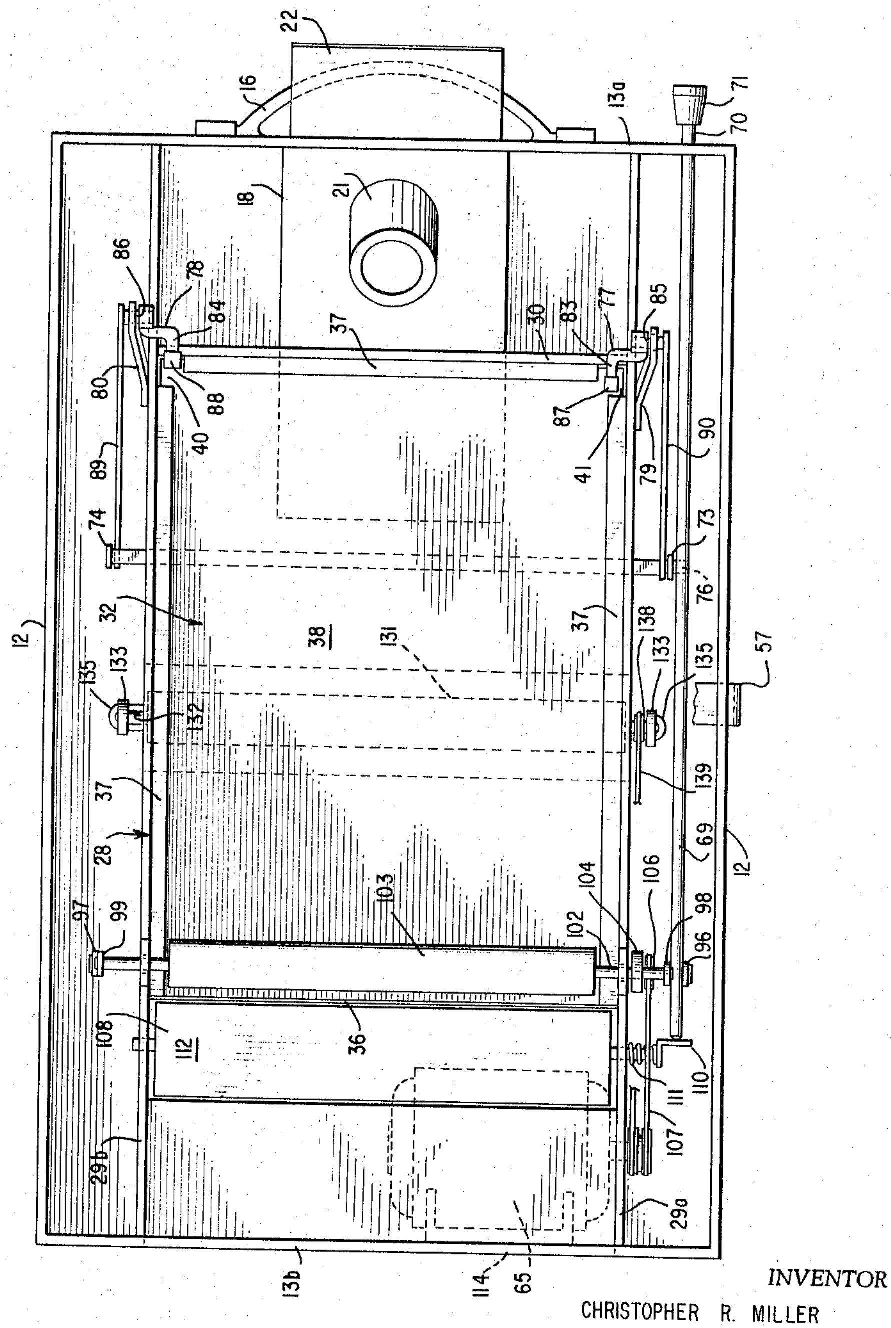
FIG. 2 is a plan view illustrating the reader printer of the present invention taken along line 2—2 of FIGURE 1.
Figure 3:
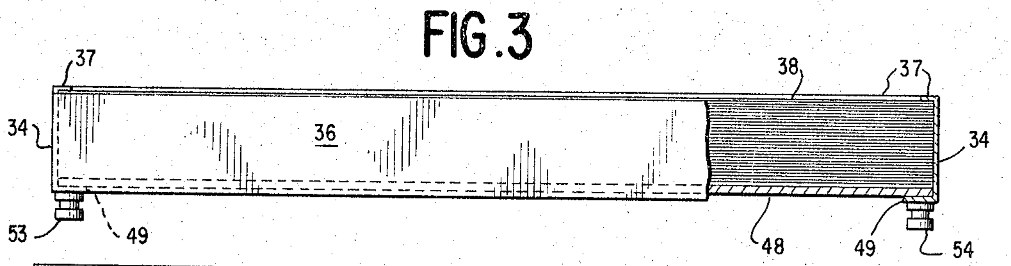
FIG. 3 is an elevational view illustrating one end of the sheet supply packet for the reader printer unit of the present invention.
Figures 4, 5, 6:
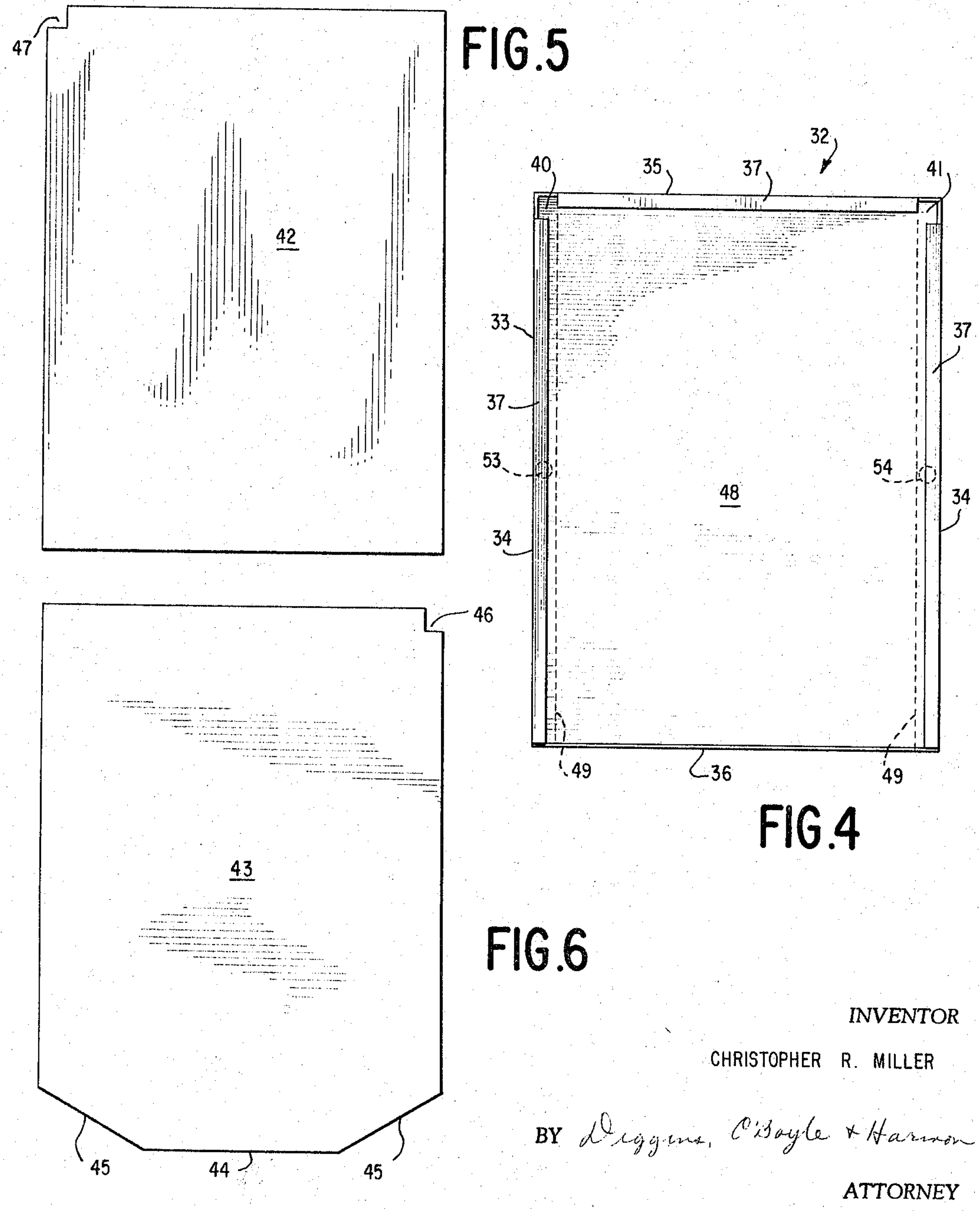
FIG. 4 is a plan view of the sheet supply packet of FIG. 3.
FIG. 5 is a plan view illustrating the opaque sheet material included within the sheet supply packet of FIG. 4.
FIG. 6 is a plan view illustrating the photosensitive sheet material included within the sheet supply packet of FIG. 4.
Figure 7:
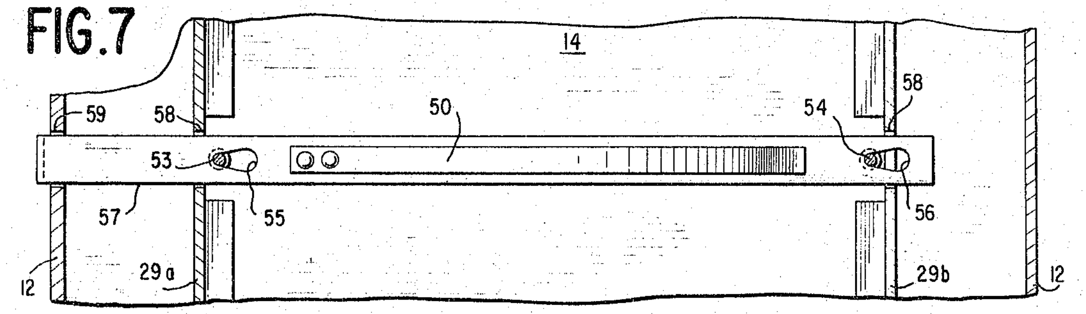
FIG. 7 is a partially sectioned view illustrating the lacking construction of the sheet supply packet of FIG. 4.

Referring now to FIGS. 1 and 2, the reader printer unit of the present invention indicated generally at 10 includes a casing 11 having side walls 12, end walls 13*a* and 13*b*, a bottom wall 14, and a hinged lid 15. When the hinged lid 15 is in a closed, latched condition, the reader printer unit 10 is similar in size and shape to a standard attache case, and may be transported in the same manner by means of a handle 16.

Basically, the reader printer unit 10 is a combination of major components which includes an optical projection system 23, a replaceable sheet supply packet 32 for visually imaging a projected image and providing a supply of photosensitive sheet material for image reproduction, a sealed photomechanical reproduction of developer unit 116, and a mechanical sheet feeding system 68 for providing photosensitive sheets from the sheet supply packet to the sealed developer unit.

The construction and operation of the reader printer unit 10 may be readily understood by considering the sequence of operations occurring subsequent to the energization of the unit and the introduction of an information bearing sheet to be reviewed.

To facilitate the introduction of an information bearing sheet, the front end wall 13*a* of the casing 11 is provided with a sheet receiving slot 17 which operates as an entrance aperture for an elongated sheet guide unit 18. Guide unit 18 includes an upper wall 19 and a spaced lower wall 20 which extends in substantially parallel relationship thereto. The guide walls 19 and 20 may be formed entirely from transparent material or may be transparent only in the vicinity of a projection lens unit 21 which is positioned above the upper guide wall 19.

Sheet guide unit 18 is adapted to receive and support an information bearing sheet 22 which is inserted through the reception slot 17. Sheet 22 will normally comprise a single microfilm or other transparent sheet of similar nature upon which a plurality of frames of documentary information are transcribed, and manual movement of the sheet 22 within the guide 18 will permit the positioning of a selected frame of information beneath the lens unit 21.

*Optical projection system*

The reader printer unit 10 incorporates a compact optical projection system 23 for projecting an enlarged image from the film sheet 22 onto a visual or photosensitive reproduction surface. This optical projection system includes a projection lamp 24 suitably mounted above the bottom wall 14 of the reader printer casing 11 and beneath the bottom wall 20 of the sheet guide 18. Projection lamp 24 is energized and controlled by an electrical control system to be hereinafter described, and when energized, will operate to project a radiant projection beam onto an internal mirror 25. Mirror 25 is mounted upon the front end wall 13*a* of the reader printer casing 11 and is angularly positioned relative to the projection lamp 24 and the lens unit 21 so that the radiant projection beam from the projection lamp 24 impinges upon the surface of the mirror 25 and is redirected thereby through the transparent sheet guide 18, and the information storage sheet 22 into the lens unit 21. Thus the image on the storage sheet 22 is projected upwardly through the lens unit 21 which focuses the projection beam upon a reflector unit 26. Reflector 26 is suitably attached to the hinged lid 15 by means of a special hinge 27 or other suitable means to permit the reflector to be snapped to an open position, as illustrated in FIG. 1, from a closed position against the inner surface of the lid 15.

The projection beam which is focused upon the reflector 26 by the lens 21 is reflected downwardly onto the surface of the top sheet of a sheet supply packet 32, which is maintained within a sheet supply and storage section 28. Supply and storage section 28 is optically aligned with the reflector 26 so that if the top sheet of the supply packet 32 is a clear, opaque sheet, this sheet is caused to provide a screen for the projection system 23 and visually reproduce the projected image.

The sheet supply and storage section 28 is bounded by inner sidewalls 29*a* and 29*b* (FIG. 2) extending upwardly from the bottom wall 14 of the casing 11 in spaced relationship with the casing sidewalls 12 and an end wall 30.

To enhance the quality of the image projected by the projection system 23 onto a sheet within the storage section 28, the storage section may be surrounded by a shielding screen 31. Shielding screen 31 may include a two piece sliding curtain attached to opposite edges of the lid 15 and movable from adjacent either side of the lid around the periphery of the reflector 26. When so manipulated, the curtain 31 can be caused to leave an opening adjacent the front of the reflector 26 and the casing 11 so that an image projected upon the supply packet 32 may be visually observed, or the two sections of the curtain may be drawn completely closed at the front of the casing 11 so that the storage section 28 is completely enclosed during a photographic reproduction process.

It is obvious that other screening devices, such as an expandable bellows unit might be employed in place of the two piece curtain 31.

*Sheet supply packet*

The sheet supply packet 32, FIGS. 3–9, constitutes a replaceable but necessary component in the overall combination of elements which cooperate to form the reader printer unit 10 and is peculiarly adapted for use in conjunction with the remaining elements of the reader printer unit. The sheet supply packet provides a replaceable projection screen for the optical projection system 23 and embodies specific constructional features which cooperate with a particular sheet feeding mechanism employed in the reader printer construction to accomplish the selective removal of the uppermost sheet in the packet. Additionally, the sheet supply packet 32 incorporates novel constructional features which render the presence of such packet in the supply and storage section 28 necessary to the operation of the reader printer 10.

Referring now to FIGS. 3–9, it will be noted that the sheet material supply packet 32 basically includes a sheet receiving container 33 of substantially rectangular configuration having side walls 34, a first end wall 35 and a second feed end wall 36. The side walls 34 and the first end wall 35 are provided with a substantially laterally extending, inwardly projecting lip 37 which is designed to overlie the uppermost sheet 38 of a stack of sheet material 39 maintained within the sheet supply packet 32.

The side walls 34 and the first end wall 35 of the sheet supply packet 32 are of substantially equal height, while the upper extremity of the feed end wall 36 terminates at a point slightly below the overlying lip portion 37 to permit the passage of a single sheet of sheet material over the feed end wall. This construction is well illustrated by FIG. 3, and it will be noted that the overlying lip portions 37 of the side walls 34 preclude the removal of sheet material from the paper packet 32 other than by removal of a single sheet above the feed end wall 36.

The corners of the overlying lip portions 37 are cut away adjacent the first end wall 35 as illustrated at 40 and 41 to facilitate the selective removal of the uppermost sheet 38 of the paper stack 39 by an automatic sheet feeding unit to be subsequently described.

The sheet material stack 39 of the packet 32 includes sheets of clear, opaque paper or similar sheet material 42 stacked in alternation with sheets of photosensitive sheet material 43. The photosensitive sheet material 43 may constitute any well known photosensitive sheets for use in a photomechanical reproduction process, and it is advantageous if the forward or feed edge 44 of each photosensitive sheet 43 is tapered as indicated at 45 to facilitate the automatic feeding of such sheets through a photomechanical reproducer. Additionally, one corner of the photosensitive sheets 43 opposite the feed edge 44 is clipped, as indicated at 46, to cooperate with the reader printer automatic sheet feeding apparatus, while a corner of the adjacent opaque sheet 42, which lies opposite the clipped corner 46 in the stack 39, is clipped as indicated at 47 to facilitate automatic sheet feeding. When the sheets 42 and 43 are alternately stacked within the sheet receiving container 33, the clipped corners 46 of the photosensitive sheets 43 are placed adjacent one cutaway portion, for example, the cutaway portion 41, of the overlying lip 37, while the clipped corners 47 of the opaque sheets 42 are placed adjacent the remaining cutaway portion, for example, the cutaway portion 40, in the overlying lip 37.

Figure 8:
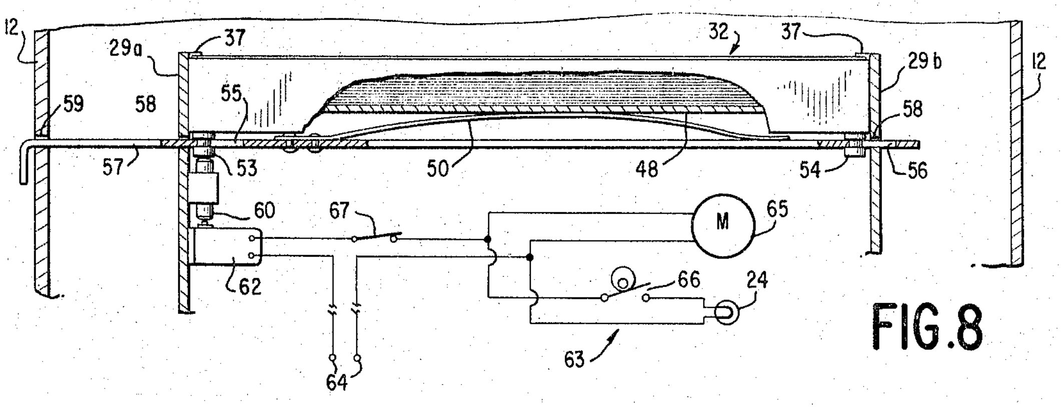
FIG. 8 is a partially sectioned side elevational view showing the supply packet of FIG. 4 in a locked, operational position.

When the sheet material stack 39 is inserted within the container 33, the stack rests upon a container bottom wall 48 which is freely movable relative to the container side walls 34 and end walls 35 and 36. Bottom wall 48 may be maintained within the confines of the side walls 34 by means of inwardly projecting lip portions 49 provided at the lower extremity of the side walls 34. These lip portions 49 extend inwardly for a distance sufficient to prevent removal of the bottom wall 48 from the sheet material container 33, but permit the bottom wall 48 to be contacted by a spring 50 which is secured within the sheet material supply and storage section 28 (FIG. 8). The spring 50, which may constitute a leaf spring or one of many other suitable spring units in common usage, operates to bias the bottom wall 48 of the sheet material container 33 upwardly in the direction of the overlying lip portion 37 when the sheet material supply packet 32 is positioned within the supply and storage section 28. Thus, as the upper sheet of sheet material 38 is automatically removed from the sheet supply packet 32, the bottom wall 48 moves upwardly relative to the side walls 34 and the end walls 35 and 36 of the sheet supply container 33 to insure that a replacement sheet of either opaque or photosensitive material is always maintained in feed position beneath the overlying lip portion 37.

Figure 9:
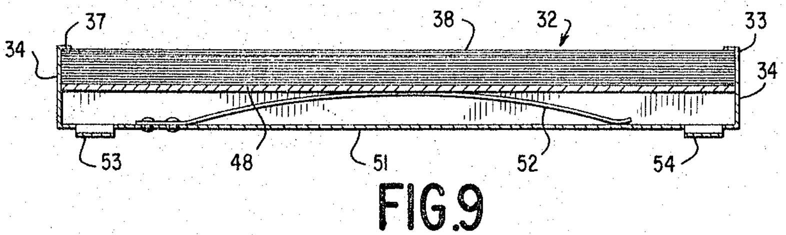
FIG. 9 is a partially sectioned side elevational view of an embodiment of the sheet supply packet of FIG. 4.

If desirable, the leaf spring 50 of FIG. 8 might be removed from the supply and storage section 28 of the reader printer 10 and included within the sheet supply packet 32, as illustrated by FIG. 9. In this embodiment, a second fixed bottom wall 51 would be secured to the side walls 34 and end walls 35 and 36 of the sheet material container 33 and would replace the inwardly projecting lip portions 49 of FIG. 3. A leaf spring 52 would then be interposed between the movable bottom wall 48 and the stationary bottom wall 51 and would operate to bias the bottom wall 48 in an upward direction as previously described.

To prevent possible damage to an automatic sheet feeding apparatus, the sheet supply packet 32, and the sheet supply and storage section 28, it is desirable to ascertain that the sheet supply packet is properly positioned and locked within the supply and storage section 28 prior to the energization and subsequent operation of the reader printer unit 10. Therefore, as a safety measure, the sheet supply packet 32 embodies special constructional features which enable the packet to operate a safety lockout mechanism which precludes the operation of the reader printer unit until the sheet supply packet is properly positioned and locked within the supply and storage section 28. To achieve this purpose, downwardly projecting grooved lock receiving members 53 and 54 are provided on the bottom section of the sheet material container 33. Locking members 53 and 54, shown as locking lugs in FIG. 3, may be secured to the lip portions 49 of the sheet material container side walls 34.

When the sheet supply packet 32 is inserted into the supply and storage section 28 of the reader printer unit 10, the locking lugs 53 and 54 project into tapered locking apertures 55 and 56 in a sliding bolt 57. Sliding bolt 57 is suitably mounted for sliding movement in slots or guides 58 and 59 provided in the casing side walls 12 and the inner side walls **29*a* and 29*b*. The upper surface of the sliding bolt 57 may be employed to mount the leaf spring 50**, as illustrated in FIG. 8.

The locking members 53 and 54 may be formed by any projection mounted on the bottom portion of the sheet material container 33 which includes a groove for cooperation with the sliding bolt 58. In FIG. 9, it will be noted that these locking members 53 and 54 compose downwardly projecting lips which are bent inwardly to overlie the sliding bolt 58.

Referring now specifically to FIG. 8, it is apparent that when the sheet material supply packet 32 is properly positioned within the supply and storage section 28 of the reader printer, the locking members 53 and 54 are securely engaged by the sliding bolt 58 to preclude the ejection of the sheet material packet by the spring 50. With the paper packet 32 so secured, the locking member 53 projects downwardly to depress a switch rod 60 which is movably mounted within a circuit box 61 (FIG. 1). Also mounted within the circuit box 61 is a spring loaded switch 62 which is closed by the downward movement of the switch rod 60 to complete a power circuit 63 for the reader printer 10. Power circuit 63 includes power input leads 64 which are connected to an external voltage source and operate to provide power to the circuit 63 through the spring loaded switch 62. Power flowing through the spring loaded switch 62 is then provided to an electric motor 65 and the projection lamp 24 of the projection system 23. The energization of the projection lamp 24 is controlled by a switch 66 which may be a cam controlled switch or a manually operated switch mounted upon the front end wall 13*a* of the casing 11. The brilliance of the projection lamp 24 is not impaired by the operation of the motor 65 due to the parallel wiring of the power circuit 63.

It will be apparent from a consideration of FIG. 8 that no energizing power can be furnished to the motor 65 or the projection lamp 24 until the power circuit 63 is completed by closing the spring loaded switch 62. Also, if desirable, a manually operable on-off switch 67 can be included to energize the circuit 63. However, as the closure of the switch 62 is only effected by properly positioning and locking the sheet material supply packet 32 within the supply and storage section 28, the presence of the sheet supply packet is necessary before operation of the reader printer unit 10 can be initiated even if the on-off switch 67 has been previously closed. The insertion of supply packets having a constructional configuration other than that of the supply packet 32 within the supply and storage section 28 will not result in the closing of the switch 62 to permit the subsequent operation of the reader printer unit.

*Automatic sheet feeding mechanism*

With the sheet material supply packet 32 locked within the supply and sotrage section 28 of the reader printer 10, the reader printer is now ready for operation. At this time, the power circuit 63 may be energized to provide power to the projection lamp 24, so that a projected image falls upon the top sheet 38 of the sheet supply packet 32. When the clear opaque sheet 42 is uppermost in the sheet material stack 33, the projected image is visually reproduced upon this sheet which operates as a projection screen. Not only does the clear opaque sheet 42 provide an excellent projection screen for the projection system 23, but this sheet may also operate as a note sheet upon which sketches, notes or other material may be transcribed by a viewer while visually referring to the projected image.

Often, subsequent to ascertaining the specific information contained within a certain frame of a microfilm or other photographic storage medium, a viewer may wish to reproduce this particular material. It is much more desirable to reproduce the projected material immediately, rather than to remove the storage medium 22 from the reader printer and then attempt to relocate the frame containing the previously located material for separate reproduction. To reproduce the visually projected image within the reader printer 10, it is first necessary to remove the opaque sheet 42 from the sheet material packet 32 so that the underlying photosensitive sheet 43 may be exposed. To accomplish this exposure operation, the projection system 23 remains energized while the shielding curtain 29 is closed about the sheet supply and storage section 28 to exclude unwanted ambient radiation. With the sheet supply and storage section 28 so enclosed, an automatic sheet feeding mechanism indicated generally at 68 is then actuated to remove the opaque sheet 42 from the sheet supply and storage section 28.

Figure 11:
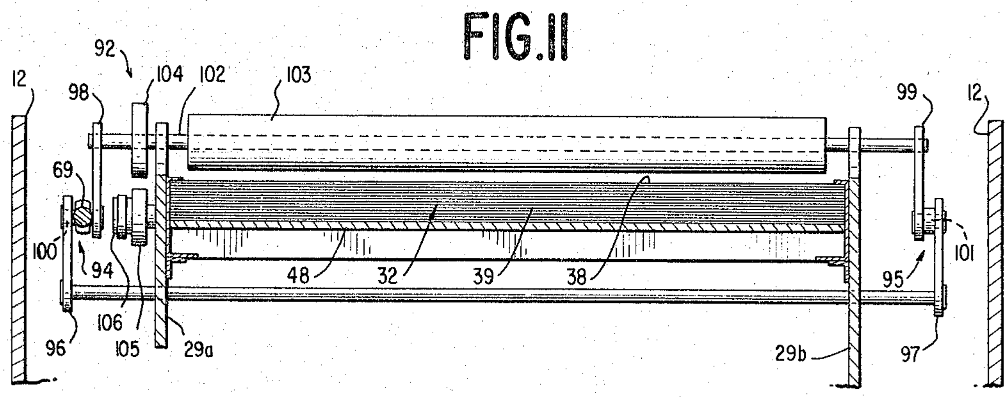
FIG. 11 is a partially sectioned view showing the roller portion of the sheet feeding mechanism of FIG. 1.

Referring now to FIGS. 1, 2 and 11 it will be noted that the automatic sheet feeding mechanism 68 includes a control rod 69 having one end 70 which extends through the front wall 13*a* of the reader printer 10 and terminates in an operating handle 71. Control rod 69 is secured to various elements of the automatic sheet feeding mechanism 69, to be hereinafter described, in a manner which permits movement of the control rod longitudinally of the reader printer casing 11.

The control rod 69 is connected to a linkage system 72 which is pivotally mounted upon the inner side walls 29*a* and 29*b* of the reader printer unit 10. Linkage system 72 includes a first elongated link 73 pivotally mounted adjacent the inner side wall 29*a* and a second elongated link 74 pivotally mounted adjacent inner side wall 29*b* by means of a pivot pin 75. Pivot pin 75 extends transversely of the reader printer unit 10 between the inner side walls 29*a* and 29*b*, and is intregally attached to the central portion of the links 73 and 74 in any suitable manner, whereby movement of one link is transmitted by means of the pivot pin 75 to cause a corresponding movement of the remaining link.

As may be noted from FIG. 1, the control rod 69 is pivotally attached to the upper portion of the link 73 by means of a pin 76, and thus longitudinal movement of the control rod 69 will cause the links 73 and 74 to pivot about a central axis formed by the pivot pin 75. This pivotal movement of the links 73 and 74 controls the operation of two spaced sheet engaging fingers 77 and 78 which are pivotally mounted upon support members 79 and 80 that extend upwardly from inner side walls 29*a* and 29*b*.

Sheet engaging fingers 77 and 78 are substantially L-shaped in configuration and include downwardly projecting legs 81 and 82 and horizontal legs 83 and 84 which extend substantially perpendicular thereto. The sheet engaging fingers 77 and 78 are pivoted about pivot pins 85 and 86 which project from the support members 79 and 80 and contact the fingers 77 and 78 at the point where the horizontally extending legs 83 and 84 meet the downwardly extending legs 81 and 82. The outer ends of the horizontally extending legs 83 and 84 are provided with sheet engaging surfaces 87 and 88.

Selective pivotal movement of the sheet engaging arms 77 and 78 about the pivot pins 85 and 86 is accomplished by means of tie rods 89 and 90 which are connected between the lower extremities of the downwardly extending legs 81 and 82 of the sheet engaging fingers 77 and 78 and the pivoted links 73 and 74. As will be noted from FIG. 1, the tie rod 90 is connected between the downwardly extending leg 81 of the sheet engaging finger 77 and the pin 76 on the link 73 which is above the pivot pin 75, while the tie rod 89 is connected between the downwardly extending leg 82 of the sheet engaging finger 78 and a point 91 on the pivoted link 74 which is below the pivot pin 75.

The operation of the linkage system 68 may best be understood with reference to FIGS. 1 and 2, where it will be noted that the sheet engaging fingers 77 and 78 are positioned relative to the sheet supply and storage section 28 so that when the sheet material supply packet 32 is locked in position, the sheet engaging surfaces 87 and 88 of the sheet engaging fingers may be selectively moved through the cutaway portions 40 and 41 in the overlying lip 37. As the control rod 69 is moved outwardly away from the casing front wall 13*a*, the tie rod 90 forces the lower extremity of the downwardly extending leg 81 to move toward the front wall 13*a*, and the sheet engaging finger 77 is pivoted about the pivot point 85 until the sheet engaging surface 87 moves through the cutaway portion 41 in the overlying lip 37 of the sheet material container 33 into engagement with an underlying sheet.

As the pivot pin 75 transmits the movement of the link 73 to the link 74, the link 74 will be caused to follow a corresponding pivotal path about the pivot pin 75. Thus, as the control rod 69 moves toward the front wall 13*a*, the link 74 is pivoted along the path followed by the link 73, and the tie rod 91 is caused to move the downwardly extending leg 82 of the sheet engaging finger 78 away from the front wall. This movement of the downwardly extending leg 82 causes the sheet engaging finger 78 to pivot about the pivot point 86, and the sheet engaging surface 88 is moved upwardly away from the cutaway portion 40 in the overlying lip 37 of the sheet material container 33. The reverse action occurs when the control handle 71 is moved inwardly toward the front wall 13*a*.

It is readily apparent that the operation of the linkage system 68 results in a selective movement of the sheet engaging fingers 77 and 78 to cause the sheet material in the sheet material packet 32 to be gripped and positively retained by either the sheet engaging surface 87 or the sheet engaging surface 88. As previously described in connection with FIGS. 5 and 6, the alternately stacked opaque and photosensitive sheets 42 and 43 are provided with notched corners 46 and 47 positioned adjacent a cutaway portion 40 or 41 in the lip 37. Therefore, when the opaque sheet 42, which for purposes of example is positioned with its notched corner 47 adjacent the cutaway portion 41, is to be removed from the sheet material container 33, the control handle 71 is pulled outwardly away from the front wall 13*a* of the reader printer unit 10. This operation of the handle 71 initiates a corresponding movement of the control rod which causes the sheet engaging finger 77 to move downwardly through the cutaway portion 41 and the clipped corner 47 in the opaque sheet 42 to engage a corner of the underlying photosensitive sheet 43. Thus, the photosensitive sheet 43 is positively gripped by the sheet engaging finger 77, while simultaneously, the sheet engaging finger 78 moves upwardly away from the cutaway portion 40 to release the uppermost opaque sheet 42 for rejection from the sheet material container 33. The reverse operation would occur if an uppermost photosensitive sheet 43 were to be removed from the sheet material container 33, and the control handle 71 would be moved toward the front wall 13*a* of the reader printer unit to cause the underlying opaque sheet to be positively gripped by the sheet engaging finger 78. Upon inward movement of the control rod 69, the finger 78 would move downwardly through the cutaway portion 40 and the clipped corner 46 of the photosensitive sheet 43 into engagement with the underlying opaque sheet 42.

To accomplish the actual physical removal of the uppermost sheet of sheet material from the sheet material supply packet 32, the control rod 69 is operatively connected to an automatic sheet feeder 92. The construction of the automatic sheet feeder 92 may best be observed by reference to FIG. 11 where it is illustrated that the sheet feeder 92 includes a rotatable primary pivot rod 93 which extends through the inner side walls 29*a* and 29*b* of the reader printer 10. The outer extremities of the primary pivot rod 93 are attached to spaced toggle units 94 and 95 in a manner whereby operation of either toggle unit results in the rotation of the primary pivot pin 93 and a corresponding movement of the remaining toggle unit.

Toggle units 94 and 95 include lower toggle links 96 and 97 which are secured to the primary pivot rod 93 and upper toggle links 98 and 99 which are joinned to the lower toggle links by means of toggle pins 100 and 101. The control rod 69 is connected to the toggle unit 94 by means of the toggle pin 100.

The upper ends of the toggle links 98 and 99 support a rotatable shaft 12 which is connected to a feed roller 103. Shaft 102 is attached to a friction drive roller 104 which cooperates with a friction drive roller 105 mounted for rotation upon the inner side wall 29*a*. The friction drive roller 105 receives driving power through a drive pulley 106 which in turn is connected to the motor 65 by any suitable driving connection 107, as indicated in broken lines in FIG. 1.

In the operation of the automatic sheet feeder 92 of FIG. 11, when it becomes desirable to remove the uppermost sheet of sheet material from the sheet supply packet 32, the control rod 69 is manipulated as previously described to cause one of the sheet retaining fingers 77 or 78 to release the sheet to be removed while the remaining finger positively retains the adjacent underlying sheet. If, as illustrated in FIG. 1, the control handle 71 of the control rod 69 is moved outwardly from the front wall 13*a* of the reader printer to release the uppermost sheet in the sheet supply packet 32, the toggle pin 100 is drawn toward the forward wall 13*a* causing the toggle links 96 and 98 to assume a V-shaped configuration. The motion of the toggle unit 94 is transmitted by the primary pivot rod 93 to the toggle unit 95, and as the upper links 98 and 99 move toward the lower links 96 and 97 about the toggle pins 100 and 101, the friction wheel 104 is drawn into contact with the friction wheel 105 while the feed roller 103 contacts the uppermost sheet 38 of the sheet material packet 39. Simultaneously, the sheet feed roller 103 is caused to rotate by the driving power transmitted from the friction drive roller 105 to the friction drive roller 104, and the uppermost sheet 38 is thereby removed by the rotating roller 103 from the sheet material packet 32, while the adjacent underlying sheet is positively retained by the sheet retaining finger 77.

To properly direct the travel of the uppermost sheet 38 from the sheet material packet 32, a substantially V-shaped sheet channeling unit 108 having a straight leg 112 and a curved leg 113 is mounted upon a pivot rod 109 which extends transversely between the inner walls 29*a* and 29*b*. The pivot rod 109 is mounted for rotation by the inner walls 29*a* and 29*b*, and, as illustrated by FIG. 2, extends through the inner wall 29*a* to connect with a channel operator 110. A coil spring or other suitable biasing means 111 is connected between the pivot pin 109 and the inner wall 29*a* to bias the channel operator 110 and the sheet channeling unit 108 in the solid line position of FIG. 1.

When the control handle 71 is moved in a direction outwardly of the front wall 13*a* of the reader printer casing 11 to cause the removal of an uppermost opaque sheet from the sheet material packet 32 as previously described, the biasing spring 111 causes the sheet channeling unit 108 to assume the solid line position in FIG. 1, and the ejected opaque sheet passes over the straight leg 112 and out through an aperture 114 in the rear wall 13*b* of the reader printer casing. The opaque sheet may then be discarded or retained if notes or sketches have been transcribed thereon.

Subsequent to the removal of the opaque sheet 42 through the aperture 114 in the casing 11, the handle 71 of the control rod 69 is moved to a neutral position to disengage the sheet feed roller 113 from the sheet material stack 39. A photosensitive sheet 43 is now uppermost in the sheet material packet 28, and the image which had been visually reproduced upon the opaque sheet will now be projected upon the photosensitive sheet to photographically expose such sheet. At the termination of a desired exposure period, the handle 71 of the control rod 69 is moved inwardly toward the front wall 13*a* of the reader printer casing 11 to cause the sheet retaining finger 77 to move upwardly away from the sheet supply packet 32 while the sheet retaining finger 78 moves downwardly to grip the opaque sheet underlying the exposed photosensitive sheet. The inward movement of the control rod 69 also operates to move the toggle pins 100 and 101 of the toggle units 94 and 95 toward the rear wall 13*b* of the reader printer casing to bring the feed roller 103 into driving contact with the exposed photosensitive sheet, now uppermost in the sheet material packet 32. Also, as the control rod 69 is moved inwardly to cause the ejection of the exposed photosensitive sheet from the sheet material packet 32, the end of the control rod contacts the channel operator 110 and forces the channel operator rearwardly against the bias of the bias spring 111. This rearward movement of the channel operator forces the channeling unit 108 to move to the dotted line position in FIG. 1 to effectively prevent the ejection of the photosensitive sheet through the aperture 114. Instead, the photosensitive sheet is caused to contact the curved leg 113 of the channeling member and follow a path around the curved leg into a sheet material guide 115 which operates as an input guide to a sealed developer unit 116.

Figure 10:
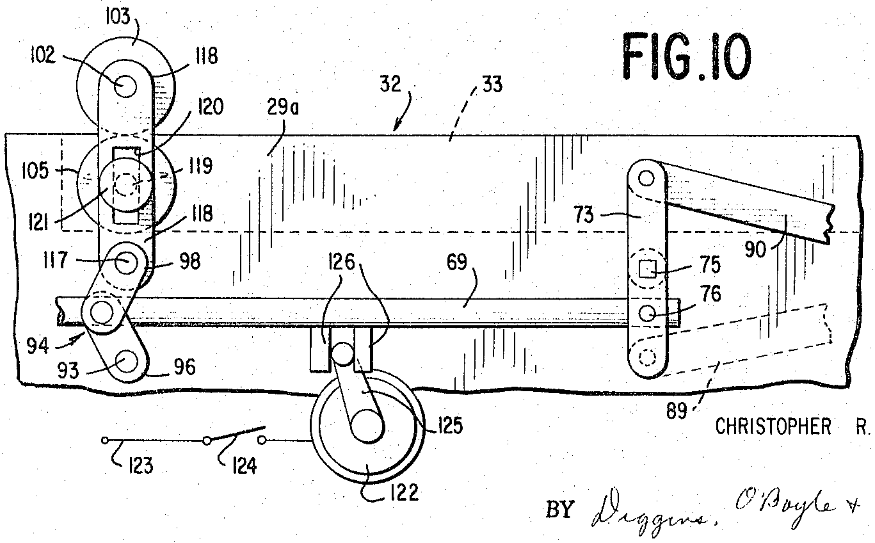
FIG. 10 illustrates a timer controlled embodiment of the lever control mechanism of FIG. 1.

It will be quite apparent that the toggle mechanism for operating the feed roller 103 is subject to numerous constructional design variations, while the operation of the automatic sheet feeding mechanism 68 to provide a timed sequence of events is readily adaptable to control by an automatic timing unit. FIG. 10 illustrates a modified toggle linkage embodiment for operating the feed roller 103 which is employed in conjunction with a timer control mechanism. For clarity of description, like reference numerals will be employed in FIG. 10 to designate components of the automatic sheet feeding mechanism 68 which are similar to components shown in FIGS. 1, 2, and 11.

Referring to FIG. 10, it will be noted that the upper link 98 of the toggle unit 94 is connected to a pivot pin 117 which projects from a shaft support 118. Shaft support 118 mounts the shaft 102 of the feed roller 103 and is movable vertically relative to a stationary shaft 119 extending through the friction drive wheel 105. Vertical movement of the support 118 along the shaft 119 is facilitated by a slot 120 through which the shaft 119 extends, and the shaft 119 is maintained within this slot by means of a large retaining cap 121 secured to the end of the shaft externally of the support 118.

The toggle unit 95 and a support (not shown) similar to the support 118 are positioned on the opposite side of the reader printer, in FIG. 10, and operate in combination with the toggle unit 94 under the control of the control rod 69 in the manner previously described with respect to FIGS. 1 and 11. Movement of the control rod 69 is transmitted by the toggle units 94 and 95 to the support 118 to bring the feed roller 103 into contact with the sheet material packet 32.

In the timer controlled embodiment of the sheet feeding mechanism 68 of FIG. 10, the manual control handle 71 and the projecting portion 70 of the control rod 69 are omitted, and the control rod is movably mounted for longitudinal movement along the inner side wall 29*a*. Timed actuation of the control rod 69 is accomplished by means of any suitable timer control motor 122 which receives power from the power circuit 63 through an electrical input connector 123. Selective energization of the timer control motor 122 might be accomplished by means of a control switch 124 mounted in a convenient location on the external surface of the reader printer casing 11.

The timer control motor 122 is connected to drive a timer cam 125 which contacts drive connections 126 provided upon the control rod 69. As the timer cam 125 is rotated by the timer control motor 122, the control rod 69 is moved in a timed sequence to accomplish the previously described sheet feeding operation. It is apparent that many suitable timer control units and driving mechanisms could be employed in conjunction with the control rod 69 to achieve the desired sequential operation of the sheet feeding mechanism 68.

*Sealed developer unit*

The sheet feeding sequence provided by the automatic sheet feeding mechanism 68 terminates when an exposed photosensitive sheet is delivered by means of an input guide 115 to a sealed photomechanical developer unit 116. The sealed developer unit 116 includes a developer trough 127 which is mounted upon the bottom wall 14 of the reader printer casing 11. This developer trough extends transversely across the reader printer casing between the inner side walls 29*a* and 29*b* as illustrated in FIG. 2 and includes end walls 128, side walls 129, and a bottom wall 130. The open top of the developer trough 127 is completely closed and sealed by a roller 131 of soft rubber or similar compressible material which is mounted in the opening defined by the walls 128 and 129. Roller 131 is mounted upon a shaft 132 which is rotatably supported in a shaft support 133. The shaft support 133 is secured for vertical adjustment relative to each end wall 128 of the developer trough 127 by means of a threaded extension 134 which is attached to the shaft support and extends through a mounting support 135 integrally connected to the side walls 128. Vertical adjustment of the shaft support 133 is accomplished by rotating two nuts 136 and 137 that are threaded upon the extension 134 and which operate to secure the shaft support within the mounting support 135.

Attached to one end of the roller shaft 132 between the roller 131 and the shaft support 133 is a drive pulley 138 which is driven by a suitable drive means 139, indicated by broken lines in FIGS. 1 and 2, extending from the motor 65.

Figure 12:
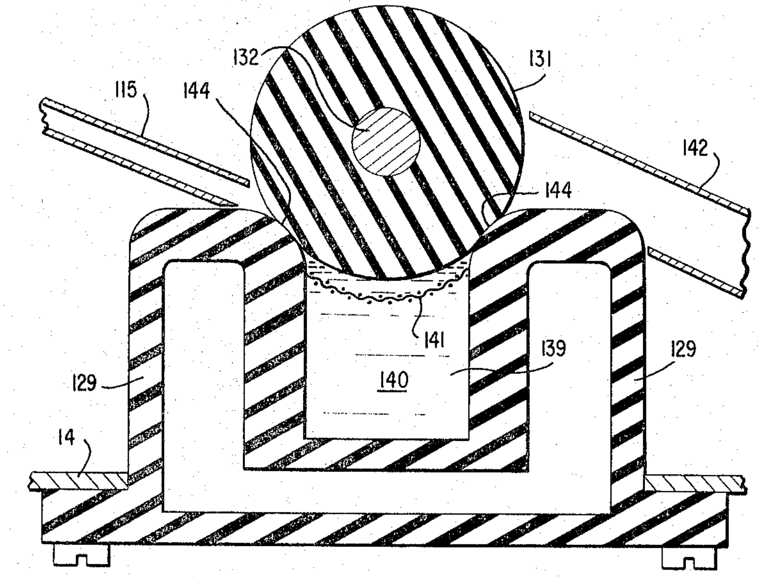
FIG. 12 is a sectional view in side elevation illustrating the sealed developing unit included in the reader printer unit of the present invention.

As will be noted from a consideration of FIG. 12, the combination of the roller 131 and the developer trough 127 provides a closed, sealed, container 139 in which a liquid developer 140 may be maintained and stored. Spaced within the closed container 139 beneath the roller 131 is a curved, porous guide 141 of screen material or other suitable perforated sheet material which will permit the liquid developer 140 to contact the underside of the roller 131. If desirable, the porous guide 141 may be eliminated by curving the bottom of the container 139 to form an integral guide.

A sheet material guide 142 extends from the output side of the sealed developer unit 116 beneath the projection lamp 124 to an exit slot 143 in the front wall 13*a* of the reader printer casing 11. Sheet material guide 142 may comprise a sheet of lucite or similar material spaced above the bottom wall 14 of the reader printer casing.

In the operation of the sealed developer unit 116, the developer fluid 140 is introduced into the container 139, and subsequently, the shaft mount 133 is vertically adjusted so that the roller 131 is forced into a compressed, sealed relationship with the surfaces of the developer trough end walls 128 and side walls 129. As is best illustrated by FIG. 12, if the contact or bearing edges 144 of the side walls 129 are angularly tapered to conform to the configuration of the roller 131, a contact bearing surface of greater area is provided. Also, the upper edges 145 of the end walls 128 which are in contact with the surface of the roller 131 may be curved to the configuration of the roller as indicated in FIG. 1 to provide an increased bearing surface at this point.

It is imperative that the roller 131 operate at all times to maintain a fluid seal at the bearing surfaces 144 and 145, but the roller must also be free to rotate smoothly so that sheet material will be caused to travel evenly between the roller and the bearing surfaces 144 while entering and leaving the container 139. Therefore, the bearing surfaces 144 and 145 must cooperate with the roller 131 to effectively seal the container 139 but permit the free passage of sheet material through the container. This necessary cooperation between the roller 131 and the bearing surfaces 144 and 145 may best be attained by employing either radial or tangential bearing surface configurations as illustrated in FIGS. 15*a*–15*g*.

With reference to FIGS. 15*a*–15*d*, it will be noted that the bearing surfaces 144 of the side walls 129 may be formed to provide either a tangential or radial seal with the roller 131.

Figure 15E:
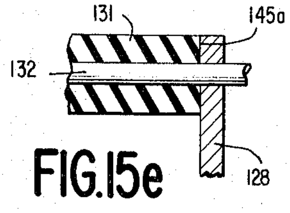
FIGS. 15*a*–15*g* are diagrammatic representations illustrating the bearing surface configurations employed in the sealed developing unit of FIG. 12.
Figure 15F:
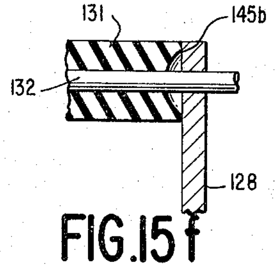
Figures 15A, 15B, 15C, 15D:
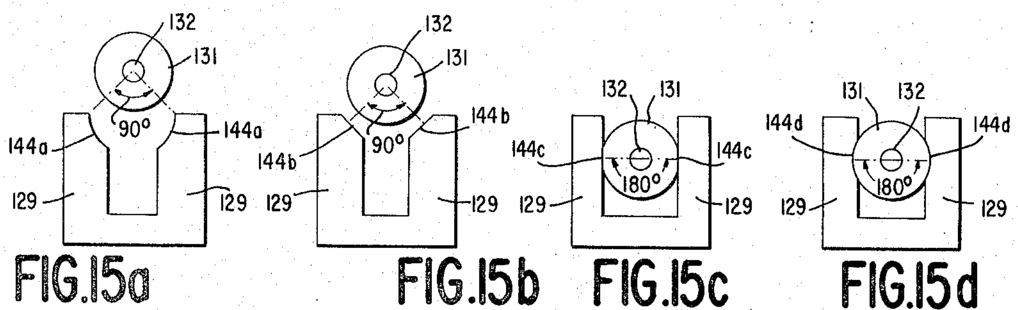

In FIG. 15*a*, the bearing surfaces 144*a* are concave in configuration and conform to the circumferential arc of the roller 131 to provide radial seals and bearing surfaces disposed angularly at 90° with relation to the roller axis, while in FIG. 15*b*, the bearing surfaces 144*b* are angularly inclined to form 90° tangential seals and bearing surfaces for the roller 131. With the bearing surface configurations of both FIGS. 15*a* and 15*b*, it will be noted that when the roller 131 is seated, the surface of the roller extends upwardly beyond the upper extremities of the side walls 129. With the roller so mounted, the sheet material guides 115 and 142, FIG. 12, may be angularly disposed at oblique angles to convey sheet material into contact with the roller and bearing surfaces, but constant downward pressure must be applied to maintain the sealed contact between the roller and the bearing surfaces. In the absence of such downward pressure, the roller 131 will move up the bearing surfaces 144*a* or 144*b* in the direction of roller rotation.

The bearing surface configurations 144*c* and 144*d* of FIGS. 15*c* and 15*d* permit the roller 131 to operate effectively without requiring an appreciable amount of external bias to maintain a fluid seal. The bearing surfaces 144*c* of FIG. 15*c* form tangential bearing surfaces and seals for the roller 131 which are angularly disposed at 180° with relation to the roller axis, while the bearing surfaces 144*d* of FIG. 15*d* form radial 180° bearing and sealing surfaces for the roller. When mounted for contact with the bearing surfaces 144*c* and 144*d*, the roller 131 is completely contained within the confines of the side walls 129 and upon rotation is not disposed to move away from the bearing surfaces. However, with the roller 131 so contained, the sheet material guides 115 and 142 must be positioned to move sheet material into contact with the roller in a substantially vertical plane.

Figure 15G:
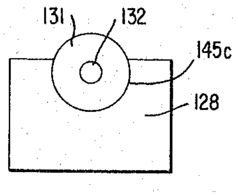

The roller bearing surfaces 145 provided by the end walls 128 may be formed as illustrated at 145*a*, 145*b*, and 145*c* in FIGS. 15*e*, 15*f*, and 15*g*.

In FIGS. 15*e* and 15*f*, the inner surfaces of the end walls 128 contact the end surfaces of the roller 131 to provide sealed bearing surfaces 145*a* and 145*b*. Although the end seal and bearing surface combination of FIGS. 15*e* and 15*f* may be employed in combination with any of the bearing surface configurations illustrated in FIGS. 15*a*–15*d*, it is preferable to employ the roller bearing seal of FIG. 15*f* to minimize friction during roller rotation. The roller-bearing surface contact of FIG. 15*f* may be achieved by dishing the roller end as illustrated, or by attaching a circular O-ring seal traveling a circumference equal to the circumference of the roller to the flat surface of the roller end.

In FIG. 15*g*, the end walls 128 are formed with bearing surfaces 145*c* which conform with the circumference of the roler 131. Bearing surfaces 145*c* may be employed with any of the sidewall bearing surfaces 144*a*–144*d*, and may partially surround the roller 131 as shown or may completely encompass the circumference of the roller.

With the soft rubber roller 131 compressed into sealed relationship with the side and end walls of the developer trough 127, there is zero clearance between the roller surface and the bearing surfaces 144 and 145. It is therefore impossible for the developer fluid 140 to escape from the sealed container 139 as the portable reader printer unit 10 is transported or moved.

After the roller 131 is compressed in sealed relationship with the developer trough 127, the roller may be rotated by driving power transmitted from the motor 65 to the drive pulley 138. Although the compressed state of the roller causes friction to exist between the roller surface and the bearing surfaces 144 and 145, the characteristics of the soft roller 131 permit the roller to conform in configuration to the bearing surfaces and to rotate smoothly in spite of friction when sufficient driving power is applied. Actually, the various configurations for the bearing surfaces 144 and 145 illustrated by FIGS. 15*a*–15*g* tend to maintain friction at a minimum upon rotation of the roller 131, and additionally, it is an added advantage to construct the trough 127 or the bearing surfaces of polyethylene, teflon, or other low friction material.

With the roller 131 driven by the motor 65, the forward edge 44 of the exposed photosensitive sheet 43 which has been moved through the sheet material guide 115 by the sheet feeding roller 103, is gripped by the rotating roller 131 and moved through the developer fluid 140. The photosensitive sheet 43 operates as a gasket between the surface of the roller 131 and the bearing surfaces 144 when the sheet is moved through the developing fluid, and the screen guide 141 insures that the photosensitive sheet is fed evenly through the developer chamber 139 and is not permitted to snag or fold within the chamber. The rotating roller 131 operates not only as a drive roller to propel the photosensitive sheet through the developer fluid 140, but additionally acts as a squeegee to remove excess developer fluid from the sheet as it leaves the chamber 139 and is fed through the sheet material guide 142. The developed photosensitive sheet is further dried in the sheet material guide 142 by the heat from the projection lamp 24.

It is apparent that the rotating soft rubber roller 131 operates effectively to seal the developer trough 127, to drive a photosensitive sheet through the developer 140 and the sheet material guide 142, to squeeze excess liquid developer from the developed photosensitive sheet, and to agitate the chemical developer 140 within the chamber 139 to prevent crystallization of the developer when no photosensitive sheet is present. It is the roller 131 employed in conjunction with the trough 127 to provide a sealed photoreproduction unit 116 which renders the reader printer unit 10 adaptable for use as an effective portable unit. The feasibilty of employing the unit as a portable unit would be completely destroyed if developer fluid could not be sealed within the unit during transportation.

*Film feed system*

The reader printer unit 10 of FIG. 1 may be adapted for the visual and photographic reproduction of information stored upon a film strip by modifying the reader printer construction to provide a drive unit for a film cassette. This modification is well illustrated by FIGS. 13 and 14, wherein like reference numerals will be employed to designate reader printer components shown in FIGS. 1 through 12.

Figure 13:
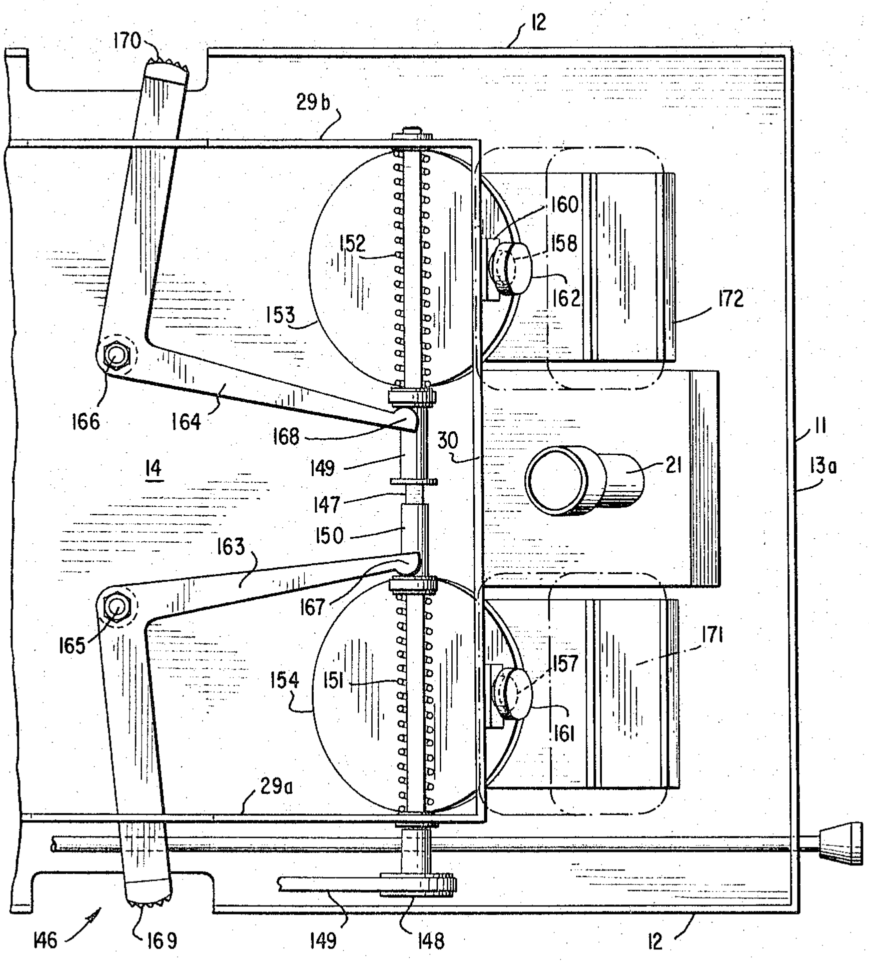
FIG. 13 is a partially sectioned plan view illustrating the film feeding section of an embodiment of the reader printer unit of the present invention.
Figure 14:
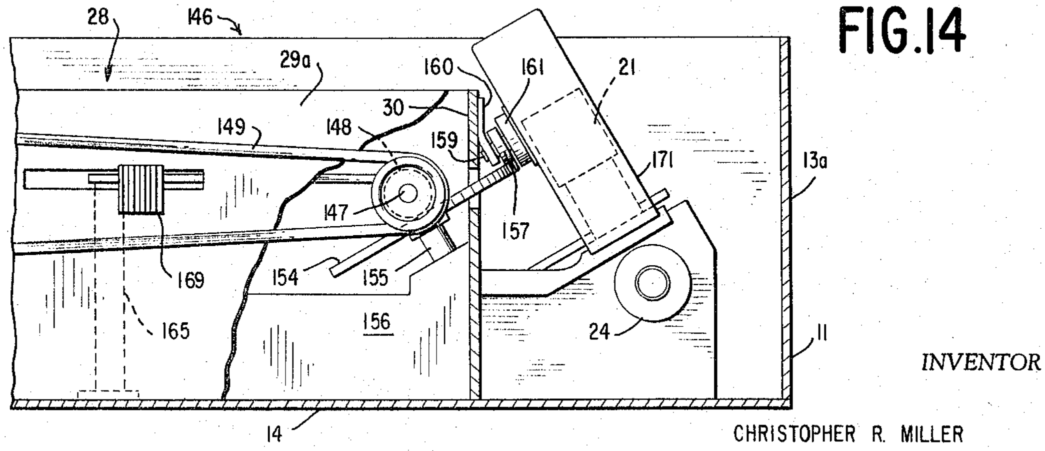
FIG. 14 is a sectional view in side elevation illustrating the film feeding section of FIG. 13.

With reference to FIGS. 13 and 14, a film cassette drive control unit 146 is mounted in the forward end of the reader printer casing 11 adjacent the projection lens 21. The film drive control unit 146 includes a drive shaft 147 which extends transversely across the reader printer casing between the inner walls 29*a* and 29*b*. Drive shaft 147 projects through the inner wall 29*a* and is connected to a drive pulley 148 which is driven from the motor 65 by means of a drive belt 149. The drive pulley 148 provides driving power to rotate the drive shaft 147 which in turn causes the rotation of two movable friction drive clutches 149 and 150. Drive clutches 149 and 150 are keyed to rotate with the drive shaft 147, but are also mounted for longitudinal movement along the drive shaft in a plane transverse to the reader printer unit 10. Bias springs 151 and 152 are mounted between the inner walls 29*a* and 29*b* of the reader printer casing 11 and the friction clutches 149 and 150 and act to bias the friction clutches toward the center of the reader printer casing away from the inner side walls.

The friction clutches 149 and 150 may be moved to contact and provide selective driving power to rotatable drive discs 153 and 154 which are mounted on either side of the reader printer casing 11 outwardly of the projection lens 21. As will be noted with reference to the drive disc construction 154 as illustrated by FIG. 14, the drive discs are mounted for rotation upon a central shaft 155 which projects angularly upward from a structural support 156 secured to the bottom wall 14 of the reader printer casing 11. The drive discs 153 and 154 in turn engage and drive friction drive wheels 157 and 158 which are designed to provide the direct driving power for a film cassette mounted upon the reader printer unit. The constructional configuration of the cassette friction drive wheels 157 and 158 is illustrated in FIG. 14 where it will be noted that the friction drive wheel 157 is mounted upon a central shaft 159 extending from a support 160 which is secured to the end wall 30 of the sheet material supply section 28. Drive wheels 157 and 158 are attached to friction drive clutches 161 and 162 which are adapted to frictionally engage and rotate a film holder within a cassette, but it is obvious that the friction drive clutches could be replaced by magnetic drives, shaft drives, or any suitable well known cassette driving means.

To control the film drive speed and driving direction, two substantially L-shaped levers 163 and 164 are mounted upon pivot pins 165 and 166 which extend upwardly from the bottom wall 14 of the reader printer casing 11. The inner ends 167 and 168 of the L-shaped levers engage the rotating friction drive clutches 149 and 150, while the other ends 169 and 170 of the levers extend through the inner side walls 29*a* and 29*b* and the outer side walls 12 of the reader printer casing.

In the operation of the film drive unit 146, a strip film containing cassette 171 is mounted adjacent the projection lens 21 in contact with the cassette drive clutch 161. It is obvious that any suitable clip or mounting means may be employed to retain the cassette 171 in driving contact with the clutch 161.

With the film containing cassette 171 in position, a film takeup cassette may be mounted in a suitable cassette mount 171, 172, and film from the cassette 171 is then threaded beneath the projection lens 21. Suitable film guides, not shown, of a type well known to the art may be provided to retain the film strip within desired operating limits as it moves beneath the projection lens.

To operate the cassette drive, the outer end 170 of the lever 164 is manipulated to pivot the lever about the pivot 166 and thereby move the friction clutch 149 against the bias of the spring 152 into contact with the drive disc 153. Rotation of the drive disc 153 causes the rotation of the cassette drives 158 and 162, and film is fed from the cassette 171 beneath the lens 21 to the takeup cassette mounted in the mount 172. The film speed may be controlled by selectively positioning the friction clutch 149 on the surface of the drive disc 153, for as the lever 164 is manipulated to move the friction clutch 149 further toward the center of the drive disc 153, the speed of rotation of the drive disc increases and the film drive speed correspondingly increases.

To reverse the direction of film drive, the outer end 170 of the lever 164 is released to permit the bias spring 152 to move the friction clutch 149 out of contact with the drive disc 153. The outer end 169 of the lever 163 is then manipulated to cause the lever 163 to pivot about the pivot pin 165 and move the drive clutch 150 into contact with the drive disc 154.

The film drive unit 146 of FIGS. 13 and 14 may be included within the reader printer construction 10 of FIG. 1, and the remaining components of the reader printer would operate in the manner previously described in connection with FIG. 1.

The operation and novel features of the reader printer unit of the present invention will be apparent to those skilled in the art from a consideration of the foregoing description, from which it will become obvious that this invention provides a simple and effective portable reader printer unit of compact construction which is capable of visually or photographically reproducing information stored upon a transparent medium. The arrangement and types of components utilized within this invention may be subject to numerous modifications well within the purview of this inventor who intends only to be limited to a liberal interpretation of the specification and appended claims.

I claim:

1. A portable reader printer for selectively providing a visual of photomechanical reproduction of an image from a light pervious storage medium comprising a support means, optical projection means secured to said support means and positioned to optically project the image from said light pervious storage medium, a removable sheet supply packet including alternately disposed sheets of clear opaque and photosensitive sheet material, said clear opaque material forming a projection screen, means to position said sheet supply packet upon said support means in optical alignment with said projection means whereby said projected image is directed upon the uppermost sheet of said supply packet, sheet feeding means secured to said support means to selectively remove the uppermost sheet from said supply packet, a sealed photomechanical reproduction unit mounted upon said support means, and means operating in conjunction with said sheet feeding means to direct said photosensitive sheets from said supply packet to said photomechanical reproduction unit.

2. The portable reader printer of claim 1 wherein said sheet feeding means includes means to eject said opaque sheets from the reader printer immediately upon the removal of said opaque sheets from said sheet supply packet.

3. A portable reader printer for selectively providing a visual or photomechanical reproduction of an image from a light pervious storage medium comprising a support means, means mounted upon said support means to support said storage medium, optical projection means secured to said support means and positioned to optically project the image from said light pervious storage medium, a sheet supply packet including a stack of sheet material, means to position said sheet supply packet upon said support means in optical alignment with said projection means whereby said projected image is directed upon the uppermost sheet of said supply packet, and sheet feeding means secured to said support means, said sheet feeding means including feed means to engage and remove the uppermost sheet from said supply packet, selective gripping means to positively retain within said sheet supply packet the adjacent sheet underlying said uppermost sheet during the removal thereof, and control means to operate said feed and selective gripping means.

4. The portable reader printer of claim 3 wherein said selective sheet gripping means include first and second sheet engaging fingers movably mounted upon said support means for engagement with said stack of sheet material and linkage means connected between said first and second sheet engaging fingers and said control means, said linkage means being operative by said control means to selectively move either said first or second sheet engaging finger into engagement with said stack of sheet material.

5. The portable reader printer of claim 4 wherein said feed means includes rotatable roller means for engaging and ejecting the uppermost sheet of said sheet material supply packet, and mounting means for mounting said roller means upon said support means for movement relative thereto, said mounting means including linkage means attached to said control means whereby said control means is operable to move said roller means into engagement with the uppermost sheet of said supply packet.

6. The portable reader printer of claim 5 wherein said control means includes an elongated control rod mounted upon said support means for longitudinal movement relative thereto and timer means mounted upon said support means, said timer means being operatively connected to said control rod to provide timed sequential movement of said rod.

7. A portable reader printer for selectively providing a visual and photographic reproduction of an image from a light pervious storage medium comprising casing means, optical projection means secured to said casing means to optically project the image from said light pervious storage medium, sheet receiving means mounted upon said casing means in optical alignment with said projection means to receive photosensitive sheet material, whereby said projected image will be directed upon the uppermost sheet of said photosensitive sheet material, means to position an opaque screen in optical alignment with said projection means to overlie the photosensitive sheet material in said sheet receiving means, control means mounted upon said casing and operable to move said screen away from overlying relationship with said photosensitive sheet means, whereby the projected image previously received by said screen is subsequently projected on to said photosensitive sheet means, a sealed photomechanical developing unit mounted upon said casing to receive and develop exposed photosensitive sheet material, said developing unit being adapted to maintain developer liquids sealed therein during both operating and non-operating conditions thereof and means mounted within said casing to selectively move photosensitive sheet material from said sheet receiving means to said sealed developing unit subsequent to the exposure thereof.

8. The portable reader printer of claim 7 wherein said sealed photomechanical developing unit includes a container adapted to hold liquid developer fluid and drive means mounted within an opening in said container, said drive means operating to engage and drive sheet material through said container while maintaining a fluid seal at the peripheral edges of said opening.

9. A portable reader printer for selectively providing a visual and photographic reproduction of an image from a light pervious storage medium comprising casing means including a base and a cover attached thereto, said cover being mounted for movement between a closed position against said base to an open position away from said base, means mounted upon said base to support said storage medium, optical projection means secured to said casing means to optically project the image from said light pervious storage medium, said optical projection means including light projecting means mounted upon said base and light reflecting means mounted upon said cover to receive and redirect the beam from said projecting means when said cover is in the open position, sheet receiving means mounted upon said base to receive and position sheet material in optical alignment with said light reflecting means whereby said projected image will be directed upon the uppermost sheet of said sheet material, at least one photo-sensitive sheet positioned within said sheet receiving means, opaque screen means positioned in optical alignment with said light reflecting means between said light reflecting means and said photosensitive sheet means, control means mounted upon said base and operable to move said screen means whereby the projected image previously received by said screen means is subsequently projected on to said photosensitive sheet, and sheet retaining means mounted upon said base to retain sheets underlying said exposed photosensitive sheets within said sheet receiving means.

10. The portable reader printer of claim 9 wherein said means to movably support said storage medium includes mounting means secured to said casing for supporting a rotatable strip film containing storage reel, said mounting means including reel driving means positioned to contact and rotate said storage reel, and drive means operatively connected to drive said reel driving means, said drive means operating to control the rotational speed and direction of said storage reel.

11. A portable reader printer for selectively providing a visual or photomechanical reproduction of an image from a light pervious storage medium comprising a casing, means mounted upon said casing to support said storage medium, motor means mounted within said casing to provide mechanical driving power for said reader printer, optical projection means secured to said casing and positioned to optically project the image from said light pervious storage medium, power circuit means connected to provide input power from an external voltage source to said motor and optical projection means, said power circuit means including safety switching means operative to selectively energize or de-energize said power circuit means, a removable sheet supply packet having switch operating means provided thereon, said sheet supply packet including a stack of sheet material, means to position said sheet supply packet within said casing in optical alignment with said projection means whereby said projected image is directed upon the uppermost sheet of said supply packet, said supply packet positioning means additionally acting to position said supply packet to cause said switch operating means to contact said safety switching means to permit the energization of said power circuit means, and sheet feeding means secured within said casing to selectively remove the uppermost sheet of said supply packet.

12. The portable reader printer of claim 11 wherein said supply packet positioning means includes locking means to positively retain said sheet supply packet within said casing.

13. The photomechanical reproduction means of claim 8 wherein said drive means includes an elongated roller of soft, resilient material mounted to extend beneath the level of the developer fluid within said container.

14. The photomechanical reproduction means of claim 13 wherein guide means are secured within said container and spaced beneath said roller.

15. In a portable reader printer which includes an optical projection system, a sheet material supply and storage section positioned in optical alignment with said projection system, a photomechanical reproduction unit, and sheet feeding means to facilitate the sequential feeding of individual sheets from sheet material maintained within said supply and storage section, said sheet feeding means including first and second sequentially operable sheet gripping means positioned to contact different areas of an individual sheet, a replaceable sheet supply packet for insertion in said supply and storage section comprising sheets of opaque sheet material adapted to provide a projection screen for said projection system, said opaque sheets being provided with a cutaway portion in the path of said first gripping means, whereby said first gripping means is prevented from contacting said opaque sheets, sheets of photosensitive sheet material for use in said photomechanical reproduction unit alternately interposed between said opaque sheets, said photosensitive sheets being provided with a cutaway portion in the path of said second gripping means, whereby said second gripping means is prevented from contacting said photosensitive sheets, and means to maintain said alternately disposed sheets stacked in packet form, said packet maintaining means being adapted to permit the sequential feeding of individual sheets by said sheet feeding means.

16. In a portable reader printer which includes an optical projection system, a sheet material supply and storage section positioned in optical alignment with said projection system, a photomechanical reproduction unit, and sheet feeding means to facilitate the sequential feeding of individual sheets from sheet material maintained within said supply and storage section, said sheet feeding means including first and second sequentially operable sheet gripping means positioned to contact spaced areas of an individual sheet, a replaceable sheet supply packet for insertion in said supply and storage section comprising sheets of opaque sheet material adapted to provide a projection screen for said projection system, said opaque sheets being provided with a cutaway portion in one peripheral edge thereof, said cutaway portion being in the path of said first gripping means, whereby said first gripping means is prevented from contacting said opaque sheets, sheets of photosensitive sheet material for use in said photomechanical reproduction unit alternately interposed between said opaque sheets, said photosensitive sheets being provided with a cutaway portion in one peripheral edge thereof, said cutaway portion being in the path of said second gripping means, whereby said second gripping means is prevented from contacting said photosensitive sheets, and sheet receiving means to maintain said sheets in packet form, said sheet receiving means being provided with cutaway openings corresponding with the cutaway portions in said opaque and photosensitive sheets.

17. The portable reader printer with replaceable sheet supply packet of claim 16 wherein the corners at one end of said sheets of opaque sheet material are removed to preclude gripping by said first gripping means, while the opposite corners at the adjacent end of said interposed sheets of photosensitive material are removed to preclude gripping by said second gripping means.

18. The portable reader printer with replaceable sheet supply packet of claim 16 wherein said sheet receiving means includes a bottom wall, side walls, a first end wall extending between said side walls, the upper extremity of said side and first end walls being formed to provide a substantially laterally extending, inwardly projecting lip overlying the uppermost sheet of said packet, and a second end wall, the upper extremity of said second end wall being spaced slightly below the inwardly projecting lip of said side walls to facilitate the passage of a single sheet of sheet material.

19. The portable reader printer with replaceable sheet supply packet of claim 18 wherein said sheets of opaque and photosensitive sheet material are inserted in said sheet receiving means with said cutaway portions adjacent the first end wall thereof, the upper lip of the side and first end wall of said sheet receiving means being cutaway to correspond with the cutaway portions in said photosensitive and opaque sheets.

20. The portable reader printer with replaceable sheet supply packet of claim 19 wherein the bottom wall of said sheet receiving means is movable relative to said side and end walls to maintain the uppermost sheet of said sheet material in contact with said upper lip.

21. The portable reader printer with replaceable sheet supply packet of claim 20 which includes spring biasing means connected to bias said bottom wall upwardly in the direction of said upper lip.

22. In a portable reader printer which includes an optical projection system, a sheet material supply and storage section positioned in optical alignment with said projection system, locking means mounted within said sheet supply and storage section, a photomechanical reproduction unit, and an electrical power circuit connected to provide electrical power from an external power source to said portable reader printer, said electrical power circuit including safety switching means operative to selectively energize or de-energize said power circuit, a replaceable sheet supply packet for insertion in said supply and storage section comprising sheets of opaque sheet material adapted to provide a projection screen for said projection system, sheets of photosensitive sheet material for use in said photomechanical reproduction unit alternately interposed between said opaque sheets, and sheet receiving means to maintain said sheets in packet form, said sheet receiving means including lock receiving means adapted to cooperate with said storage section locking means to positively retain said replaceable sheet supply packet within said supply and storage section, said lock receiving means additionally operating to contact said safety switching means to permit the energization of said power circuit when said replaceable sheet supply packet is positioned within said supply and storage section.

23. The portable reader printer with replaceable sheet supply packet of claim 22 wherein said lock receiving means adapted to cooperate with said storage section locking means includes downwardly extending, grooved receiving means projecting from the underside of said sheet receiving means.

24. In a portable reader printer which includes an optical projection system, a sheet material supply and storage section positioned in optical alignment with said projection system, and sheet feeding means to facilitate the sequential feeding of individual sheets from sheet material maintained within said supply and storage section, said sheet feeding means including first and second sequentially operable sheet gripping means positioned to contact different areas of an individual sheet, a replaceable sheet supply packet for insertion in said supply and storage section comprising a stack of sheet material adapted to receive a projected image from said optical projection system, said stack of sheet material including a plurality of alternately oriented individual sheets, each said individual sheet being provided with a cutaway portion in one peripheral edge thereof, and means to maintain said alternately disposed sheets stacked in packet form whereby the cutaway portion in alternate sheets within said stack is maintained in the path of said first gripping means while the cutaway portion in the remaining sheets is maintained in the path of said second gripping means.

25. In a portable reader printer which includes an optical projection system, a sheet material supply and storage section positioned in optical alignment with said projection system, locking means mounted within said sheet supply and storage section, and sheet feeding means to facilitate the sequential feeding of individual sheets from sheet material maintained within said supply and storage section, said sheet feeding means including first and second sequentially operable sheet gripping means positioned to contact different areas of an individual sheet, a replaceable sheet supply packet for insertion in said supply and storage section comprising a stack of sheet material adapted to receive a projected image from said optical projection system, said stack of sheet material including a plurality of alternately oriented individual sheets, each said individual sheet being provided with a cutaway portion in one peripheral edge thereof, and means to maintain said alternately disposed sheets stacked in packet form whereby the cutaway portion in alternate sheets within said stack is maintained in the path of said first gripping means while the cutaway portion in the remaining sheets is maintained in the path of said second gripping means, said sheet receiving means including lock receiving means adapted to cooperate with said storage section locking means to positively retain said replaceable sheet supply packet within said supply and storage section.

26. In a portable reader printer which includes an optical projection system, a sheet material supply and storage section positioned in optical alignment with said projection system, sheet feeding means to facilitate the sequential feeding of individual sheets from sheet material maintained within said supply and storage section, said sheet feeding means including first and second sequentially operable sheet gripping means positioned to contact different areas of an individual sheet, and an electrical power circuit connected to provide electrical power from an external power source to said portable reader printer, said electrical power circuit including safety switching means operative to selectively energize or de-energize said power circuit, a replaceable sheet supply packet for insertion in said supply and storage section comprising a stack of sheet material adapted to receive a projected image from said optical projection system, said stack of sheet material including a plurality of alternately oriented individual sheets, each said individual sheet being provided with a cutaway portion in one peripheral edge thereof, and means to maintain said alternately disposed sheets stacked in packet form whereby the cutaway portion in alternate sheets within said stack is maintained in the path of said first gripping means while the cutaway portion in the remaining sheets is maintained in the path of said second gripping means, said sheet receiving means including lock receiving means adapted to cooperate with said storage section locking means to positively retain said replaceable sheet supply packet within said supply and storage section, said lock retaining means additionally operating to contact said safety switching means to permit the energization of said power circuit when said replaceable sheet supply packet is positioned within said supply and storage section.

27. In a portable reader printer which includes an optical projection system, a sheet material supply and storage section positioned in optical alignment with said projection system, locking means mounted within said sheet supply and storage section, a photomechanical reproduction unit, and sheet feeding means to facilitate the sequential feeding of individual sheets from sheet material maintained in said supply and storage section, said sheet feeding means including first and second sequentially operable sheet gripping means positioned to contact different areas of an individual sheet, a replaceable sheet supply packet for insertion in said supply and storage section comprising sheets of opaque sheet material adapted to provide a projection screen for said projection system, said opaque sheets being provided with a cutaway portion in one peripheral edge thereof, said cutaway portion being in the path of said first gripping means, whereby said first gripping means is prevented from contacting said opaque sheets, sheets of photosensitive sheet material for use in said photomechanical reproduction unit alternately interposed between said opaque sheets, said photosensitive sheets being provided with a cutaway portion in one peripheral edge thereof, said cutaway portion being in the path of said second gripping means, whereby said second gripping means is prevented from contacting said photosensitive sheets, and sheet receiving means including lock receiving means adapted to cooperate with said storage section locking means to positively retain said replaceable sheet supply packet within said supply and storage section, said sheet receiving sheet means being formed to maintain said sheets in packet form and including cutaway openings corresponding with the cutaway portions in said opaque and photosensitive sheets.

28. In a portable reader printer which includes an optical projection system, a sheet material supply and storage section positioned in optical alignment with said projection system, locking means mounted within said sheet supply and storage section, a photomechanical reproduction unit, sheet feeding means to facilitate the sequential feeding of individual sheets from sheet material maintained in said supply and storage section, said sheet feeding means including first and second sequentially operable sheet gripping means positioned to contact spaced areas of an individual sheet, and an electrical power circuit connected to provide electrical power from an external power source to said portable reader printer, said electrical power circuit including safety switching means operative to selectively energize or de-energize said power circuit, a replaceable sheet supply packet for insertion in said supply and storage section comprising sheets of opaque material adapted to provide a projection screen for said projection system, said opaque sheets being provided with a cutaway portion in one peripheral edge thereof, said cutaway portion being in the path of said first gripping means, whereby said first gripping means is prevented from contacting said opaque sheets, sheets of photosensitive sheet material for use in said photomechanical reproduction unit alternately interposed between said opaque sheets, said photosensitive sheets being provided with a cutaway portion in one peripheral edge thereof, said cutaway portion being in the path of said second gripping means, whereby said second gripping means is prevented from contacting said photosensitive sheets, and sheet receiving means including lock receiving means adapted to cooperate with said storage section locking means to positively retain said replaceable sheet supply packet within said supply and storage section, said lock receiving means additionally operating to contact said safety switching means to permit the energization of said power circuit when said replaceable sheet supply packet is positioned within said supply and storage section, said sheet retaining means being formed to maintain said sheets in packet form and including cutaway openings corresponding with the cutaway portions in said opaque and photosensitive sheets.

29. The portable reader printer with replaceable sheet supply packet of claim 28 wherein the corners at one end of said sheets of opaque sheet material are removed to preclude gripping by said first gripping means, while the opposite corners at the adjacent end of said interposed sheets of photosensitive sheet material are removed to preclude gripping by said second gripping means.

30. The portable reader printer with replaceable sheet supply packet of claim 29 wherein said sheet receiving means includes a bottom wall, side walls, a first end wall extending between said side walls, the upper extremity of said side and first end walls being formed to provide a substantially laterally extending, inwardly projecting lip overlying the uppermost sheet of said packet, and a second end wall, the upper extremity of said second end wall being spaced slightly below the inwardly projecting lip of said side walls to facilitate the passage of a single sheet of sheet material.

31. The portable reader printer with replaceable sheet supply packet of claim 30 wherein said sheets of opaque and photosensitive sheet material are inserted in said sheet receiving means with said cutaway corners adjacent the first end wall thereof, the upper lip of the side and first end walls of said sheet receiving means being cutaway to correspond with the cutaway portions in said photosensitive and opaque sheets.

32. The portable reader printer with replaceable sheet supply packet of claim 31 wherein the bottom wall of said sheet receiving means is movable relative to said side and end walls to maintain the uppermost sheet of said sheet material in contact with said upper lip.

33. The portable reader printer with replaceable sheet supply packet of claim 32 which includes spring biasing means connected to bias said bottom wall upwardly in the direction of said upper lip.

34. The portable reader printer with replaceable sheet supply packet of claim 33 wherein said lock receiving means adapted to cooperate with said storage section locking means includes downwardly extending grooved projecting means secured to the underside of said sheet receiving means.

35. A replaceable sheet supply packet for use in a reader printer unit for selectively providing a visual or photomechanical reproduction comprising a stack of sheet material adapted for use in said reader printer unit, said stack of sheet material including a plurality of alternately oriented individual sheets, each said individual sheet being provided with a cutaway portion in one peripheral edge thereof, and means to maintain said alternately disposed sheets stacked in packet form whereby the cutaway portions in alternate sheets within said stack are maintained in alignment but oppositely disposed from the cutaway portions in the remaining interposed sheets.

36. The replaceable sheet supply packet of claim 35 wherein said sheet receiving means includes cutaway openings corresponding with cutaway portions in said alternately disposed sheets.

37. The replaceable sheet supply packet of claim 36, wherein said sheet receiving means includes a bottom wall, side walls, a first end wall extending between said side walls, the upper extremity of said side and first end walls being formed to provide a substantially laterally extending, inwardly projecting lip overlying the uppermost sheet of said packet, and a second end wall, the upper extremity of said second end wall being spaced slightly below the inwardly projecting lip of said side walls to facilitate the passage of a single sheet of sheet material.

38. The replaceable sheet supply packet of claim 37 wherein said sheet receiving means is provided with lock receiving means adapted to cooperate with external locking means included within a reader printer unit.

39. The replaceable sheet supply packet of claim 38 wherein said stack of sheet material includes alternately disposed sheets of clear opaque and photosensitive sheet material.

40. The replaceable sheet supply packet of claim 39 wherein said bottom wall of said sheet receiving means is movable relative to said side and end walls to maintain the uppermost sheet of said sheet material in contact with said upper lip, and spring biasing means is connected to bias said bottom wall upwardly in the direction of said upper lip.

References Cited by the Examiner

UNITED STATES PATENTS

| | | | |
|---|---|---|---|
| 2,315,452 | 3/1943 | Pifer | 88—24 |
| 2,488,434 | 11/1949 | Pratt et al. | 88—24 X |
| 2,517,414 | 8/1950 | Pratt et al. | 88—24 |
| 2,537,069 | 1/1951 | Lohr | 88—24 |
| 3,086,438 | 4/1963 | Takats | 95—94 |
| 3,095,798 | 7/1963 | Kelly | 95—94 |
| 3,167,996 | 2/1965 | Adler | 88—24 |

NORTON ANSHER, *Primary Examiner.*

JOHN M. HORAN, *Examiner.*

R. A. WINTERCORN, *Assistant Examiner.*